United States Patent
Naftolin et al.

(10) Patent No.: US 8,762,423 B2
(45) Date of Patent: Jun. 24, 2014

(54) SHUFFLING PLAYBACK CONTENT BASED ON MULTIPLE CRITERIA

(75) Inventors: Jordan B. Naftolin, Seattle, WA (US); Thamer A. Abanami, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/462,519

(22) Filed: May 2, 2012

(65) Prior Publication Data

US 2012/0215331 A1    Aug. 23, 2012

Related U.S. Application Data

(63) Continuation of application No. 12/561,022, filed on Sep. 16, 2009, now Pat. No. 8,214,399.

(51) Int. Cl.
  G06F 7/00    (2006.01)
  G06F 17/30    (2006.01)
(52) U.S. Cl.
  USPC .............................. 707/803; 715/716; 715/730
(58) Field of Classification Search
  USPC ........... 707/790, 791, 800, 803, 999.3, 999.1; 715/716, 730
  See application file for complete search history.

(56) References Cited

U.S. PATENT DOCUMENTS

| | | | |
|---|---|---|---|
| 6,031,797 A | 2/2000 | Van Ryzin et al. | |
| 6,933,432 B2 | 8/2005 | Shteyn et al. | |
| 7,882,435 B2 | 2/2011 | Kretz et al. | |
| 8,214,399 B2 | 7/2012 | Naftolin | |
| 8,285,404 B1 * | 10/2012 | Kekki | 700/94 |
| 2002/0103796 A1 | 8/2002 | Hartley | |
| 2004/0215733 A1 | 10/2004 | Gondhalekar et al. | |
| 2005/0240661 A1 | 10/2005 | Heller | |
| 2006/0195516 A1 | 8/2006 | Beaupre | |
| 2006/0195790 A1 * | 8/2006 | Beaupre et al. | 715/727 |
| 2007/0025194 A1 | 2/2007 | Morse et al. | |
| 2007/0053268 A1 | 3/2007 | Crandall et al. | |
| 2007/0220114 A1 | 9/2007 | Kaarela et al. | |
| 2007/0239687 A1 | 10/2007 | Seymour | |
| 2007/0255752 A1 | 11/2007 | Miller | |

(Continued)

OTHER PUBLICATIONS

"Non-Final Office Action", U.S. Appl. No. 12/561,022, (Nov. 9, 2011),14 pages.
"Notice of Allowance", U.S. Appl. No. 12/561,022, (Mar. 2, 2012),10 pages.

(Continued)

*Primary Examiner* — Hares Jami
(74) *Attorney, Agent, or Firm* — Micah Goldsmith; Glen Johnson; Micky Minhas

(57) ABSTRACT

Each of one or more songs in a song list is analyzed to determine whether the song satisfies a set of criteria at its current location. For each of the one or more songs that satisfies the set of criteria, the song is kept at its current location in the song list. For each of the one or more songs that does not satisfy the set of criteria, an attempt is made to select (e.g., randomly) another song in an unprocessed portion of the song list that satisfies the set of criteria. If a selected song satisfies the set of criteria then the song and the selected song are swapped. However, if greater than a threshold number of attempts to select a song that satisfies the set of criteria are made, then the song is kept at its current location in the song list.

19 Claims, 6 Drawing Sheets

(56) References Cited

U.S. PATENT DOCUMENTS

| | | | |
|---|---|---|---|
| 2008/0208775 A1 | 8/2008 | Vossen et al. | |
| 2008/0294277 A1 | 11/2008 | Hicken et al. | |
| 2008/0301173 A1 | 12/2008 | Ryu et al. | |
| 2009/0063976 A1 | 3/2009 | Bull et al. | |
| 2009/0070412 A1* | 3/2009 | D'Angelo et al. | 709/203 |
| 2009/0106658 A1 | 4/2009 | Crandall et al. | |
| 2009/0172542 A1 | 7/2009 | Girish et al. | |
| 2010/0318544 A1* | 12/2010 | Nicolov | 707/759 |
| 2011/0066633 A1 | 3/2011 | Naftolin et al. | |

OTHER PUBLICATIONS

Grigoriev, Michael "Shuffle Your Music the Smart Way", Retrieved from: <http://www.linux.com/archive/feature/51844> on Jul. 30, 2009, (Feb. 14, 2006),6 pages.

H, Jerrod "An Introduction to iTunes 5's New Features", Retrieved from: <http://www.ilounge.com/index.php/articles/comments/itunes-5-feature-introduction> on Jul. 30, 2009, (Sep. 7, 2005),12 pages.

* cited by examiner

SHUFFLING PLAYBACK CONTENT BASED ON MULTIPLE CRITERIA

RELATED APPLICATIONS

This application is a continuation of and claims priority to U.S. patent application Ser. No. 12/561,022, filed Sep. 16, 2009, the entire disclosure of which is incorporated by reference.

BACKGROUND

Content playback devices have become increasingly commonplace and allow for playback of a variety of different audio and/or video content. Such devices can oftentimes store large amounts of content that the user can select for playback. Rather than playing back the content in a specific order requested by the user, these devices can also provide a shuffle playback option that randomly selects the order for content playback. Unfortunately, current shuffle playback options oftentimes generate an ordering that does not appear sufficiently random to the user of the device and/or is otherwise not enjoyable to the user of the device. This, in turn, can lead to user frustration and annoyance with the device.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a method for generating a shuffled list in a device includes selecting a first song from a song list and determining whether it satisfies a set of criteria. If the first song satisfies the set of criteria, then the first song is kept in the current location in the song list. However, if the first song does not satisfy the set of criteria, then an attempt is made to find another song in the song list that does satisfy the set of criteria. This is done, for example, by randomly selecting a second song from the song list and checking whether the set of criteria is met for this song. If this second song satisfies the set of criteria, then the first song and the second song are swapped in the song list.

In accordance with one or more aspects, each of one or more songs in a song list is analyzed to determine whether the song satisfies a set of criteria at its current location. For each of the one or more songs that satisfies the set of criteria, the song is kept at its current location in the song list. For each of the one or more songs that does not satisfy the set of criteria, an attempt is made to randomly select another song in an unprocessed portion of the song list that satisfies the set of criteria. If a randomly selected song satisfies the set of criteria then the song and the randomly selected song are swapped. However, if greater than a threshold number of attempts to randomly select a song that satisfies the set of criteria are made, then the song is kept at its current location in the song list.

BRIEF DESCRIPTION OF THE DRAWINGS

The same numbers are used throughout the drawings to reference like features.

DETAILED DESCRIPTION

Shuffling playback content based on multiple criteria is discussed herein. Generally, a song list is obtained and is initially shuffled by applying a context-free, standard randomization algorithm. The songs are then sequentially analyzed in this list and re-arranged so that the song ordering in the resulting list satisfies a set of criteria.

For each song in the list, the song is analyzed to determine whether it satisfies a set of criteria at its current location. If the set of criteria is satisfied, then the song is kept at its current position in the list and the next song in the list is analyzed. If the set of criteria are not satisfied for the current song, then songs from the unprocessed portion of the list are randomly selected and analyzed until either a) a song is found that satisfies the set of criteria for the current position, in which case the two songs are swapped, or b) the number of attempts to find another song that satisfies the set of criteria exceeds a configurable threshold, in which case the current song is kept in its current position. In either case, the current position is considered part of the processed list, and the next song in the list is then analyzed. This continues until the end of the list is reached, or the number of processed songs reaches a configurable maximum.

Figure 1:
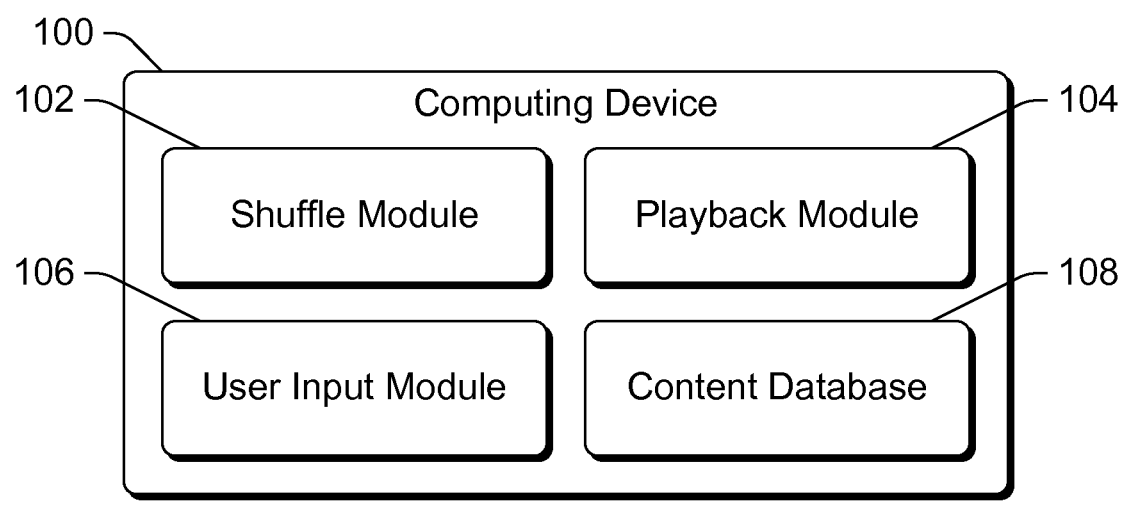
FIG. 1 is a block diagram illustrating an example computing device implementing the shuffling playback content based on multiple criteria in accordance with one or more embodiments.

FIG. 1 is a block diagram illustrating an example computing device 100 implementing the shuffling playback content based on multiple criteria in accordance with one or more embodiments. Computing device 100 can be a variety of different types of devices such as a portable audio and/or video playback device, a desktop computer, a netbook or notebook computer, a mobile station, an entertainment appliance, a set-top box communicatively coupled to a display device, a television, a cellular or other wireless phone, a personal digital assistant (PDA), a game console, an automotive computer, and so forth. Thus, computing device 100 may range from a full resource device with substantial memory and processor resources (e.g., personal computers, game consoles) to a low-resource device with limited memory and/or processing resources (e.g., traditional set-top boxes, portable music players).

Computing device 100 includes a shuffle module 102, a playback module 104, a user input module 106, and a content database 108. Each of modules 102, 104, and 106 can be implemented in software, firmware, hardware, or combinations thereof. When implemented in software or firmware, such a module includes one or more instructions that are executed by one or more processors or controllers of device 100. Computing device 100 can also optionally include a screen (not shown) for the display of content and/or a user interface. Such a screen can be implemented in a variety of different manners, such as using liquid crystal display (LCD) technology, plasma screen technology, image projection technology, and so forth. Computing device 100 can also optionally generate one or more signals that are output to one or more other display devices which include such a screen.

Content database 108 stores content for playback by computing device 100. This content can be a variety of different types of content, such as audio content, video content, audio and video content, and so forth. The content is oftentimes referred to herein as being music content or songs, although the techniques discussed herein can be used analogously with other types of content. Content database 108 can be implemented in a variety of different manners, such as using solid state memory components (e.g., Flash memory), magnetic disks, optical discs, and so forth. Additionally, content database 108 can be implemented on fixed storage media in computing device 100 and/or removable storage media.

Playback module 104 plays back content from content database 108. For example, module 104 plays back audio content and/or displays video content. The particular content that is played back by module 104 at any particular time is dependent on input received from a user (e.g., selection of a shuffle playback, selection of a particular play list, selection of a particular song) and/or from some other component or module of computing device 100 (e.g., shuffle module 102).

Input module 106 receives user inputs from a user of computing device 100. User inputs can be provided in a variety of different manners, such as by pressing a particular portion of a touchpad or touchscreen of device 100, or pressing one or more keys of a keypad or keyboard of device 100. Touchscreen functionality can be provided using a variety of different technologies, such as through capacitive, surface acoustic wave, resistive, optical, strain gauge, dispersive signals, acoustic pulse, or other touchscreen technologies. The user input can also be provided in other manners, such as via audible inputs, other physical feedback input to the device (e.g., tapping any portion of device 100 or another action that can be recognized by a motion detection component of device 100, such as shaking device 100, rotating device 100, etc.), and so forth.

Shuffle module 102 generates a shuffle list of content from content database 108 for playback by playback module 104. The shuffle list is a playlist of content that is organized in a shuffled manner to have a somewhat random or "mixed up" appearance for playback. The organization of songs on the shuffle list may not be truly random, but is designed to have an appearance of being well-shuffled or mixed up. This shuffle list can be used by playback module 104 to playback the songs in the shuffled order identified by the shuffle list.

Figure 2:
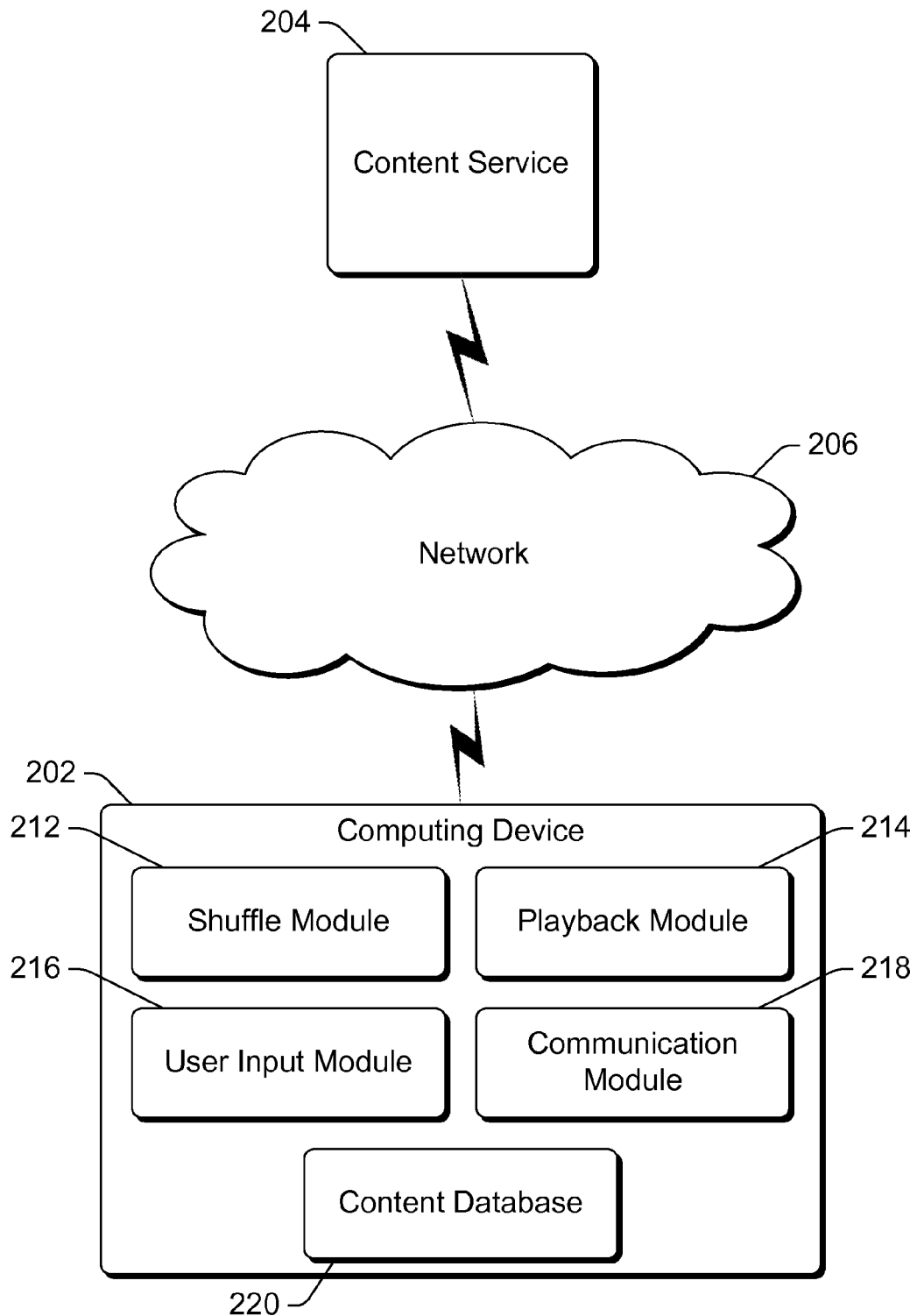
FIG. 2 illustrates another example system implementing the shuffling playback content based on multiple criteria in accordance with one or more embodiments.

FIG. 2 illustrates another example system 200 implementing the shuffling playback content based on multiple criteria in accordance with one or more embodiments. System 200 includes a computing device 202 a content service 204, and a network 206. Network 206 can be a variety of different networks, including the Internet, a local area network (LAN), a public telephone network, a cellular or other wireless phone network, an intranet, other public and/or proprietary networks, combinations thereof, and so forth.

Computing device 202 can be a variety of different types of computing devices, analogous to computing device 100 of FIG. 1. Computing device 202 includes a shuffle module 212, a playback module 214, a user input module 216, and a content database 220, analogous to shuffle module 102, playback module 104, user input module 106, and content database 108 of FIG. 1, respectively.

Content service 204 is a remote service implemented on one or more computing devices accessed via network 206. Content service 204 maintains various content that can be played back by playback module 214. Although only one content service 204 is illustrated in FIG. 2, it is to be appreciated that computing device 202 can obtain content from multiple different content services 204. Similarly, it is to be appreciated that content service 204 can provide content to multiple different computing devices 202.

Computing device 202 also includes a communication module 218. Communication module 218 manages communication between computing device 202 and content service 204 via network 206. Communication module 218 can obtain this content and store the content in content database 220, or alternatively provide the content to playback module 214 for playback as the content is received (e.g., playback of streaming content).

Alternatively, computing device 202 need not include content database 220. Rather, computing device 202 can receive its content for playback from content service 204 rather than content database 220.

Thus, as can be seen from FIGS. 1 and 2, the computing device playing back content can be a standalone device, or alternatively a device that communicates with and receives content from one or more content services.

Generally, the shuffle module (module 102 of FIG. 1 or module 212 of FIG. 2) generates a shuffle list based on the content available for playback, which can be content from a local content database (on the same computing device as the shuffle module) and/or a remote content service (e.g., obtained via network 106). This shuffle list is a playlist identifying particular content to play at different times, including content from a local content database and/or a remote content service. The shuffle list has multiple entries or slots in a particular order, with different content being identified in each entry or slot. The particular content identified in a particular slot is selected to have a shuffled or mixed up appearance for playback as discussed below.

The shuffle module generates the shuffle list based on a set of multiple criteria being satisfied. Examples of criteria that can be included in this set of criteria are discussed below. A variety of different combinations of these criteria can be used as the set of criteria that are to be satisfied by a particular song as discussed in more detail below. It is to be appreciated that the following criteria are examples, and that other criteria can alternatively be used.

Favor liked longs. Songs that have been identified by the user as songs that he or she likes are to occur at a particular frequency in the shuffle list. A particular frequency can be identified (e.g., every $7^{th}$ song in the shuffle list is to be a song that the user has indicated that he or she likes).

Avoid disliked songs. Songs that have been identified by the user as songs that he or she dislikes are to occur at no more than a particular frequency in the shuffle list or are not to occur at particular locations in the shuffle list. For example, songs the user has indicated that he or she dislikes are not to be included in the first 37 songs of the shuffle list. Alternatively, these songs could all be moved to the end of the list.

Avoid repeating artists too frequently. Songs having the same artist are not to occur in close proximity to each other in the shuffle list. This helps to make the shuffle list appear more "random" in that two songs from the same artist will not occur one after the other. The proximity distance can be a fixed number (e.g., 5), or a relative number (e.g., half the number of artists in the user's music collection).

Select new content from content service at particular intervals. New content is to be obtained from a remote content service (e.g., content service 204 of FIG. 2) at a particular frequency. For example, every $53^{rd}$ song is to be a song obtained from a remote content service rather than a local content database. This enables users to discover new music from the remote content service in their shuffle list.

Favor high play count songs. Songs that are played back often by a user can be inherently identified as being liked by the user. A song with a high play count can be identified based on a fixed number (e.g., played back more than 10 times) or a relative number (e.g., the 10% of songs available to the device that are played back most frequently). Songs that are played back often by the user are to occur with a particular frequency in the shuffle list.

Avoid high skip count songs. Songs that are skipped over often by a user can be inherently identified as being disliked by the user. A song with a high skip count can be identified based on a fixed number (e.g., skipped over more than 10 times) or a relative number (e.g., the 10% of songs available to the device that are skipped over most frequently). Songs that are skipped over often by the user are to occur at no more than a particular frequency in the shuffle list or are not to occur at particular locations in the shuffle list.

Favor songs that friends enjoy. Songs that friends of a user of a device enjoy are to occur at a particular frequency in the shuffle list. Songs that friends of the user enjoy can be identified in different manners, such as by accessing a social networking service that includes an indication of songs that the user's friends enjoy.

Favor popular songs in marketplace. Songs that are popular in a marketplace are to occur at a particular frequency in the shuffle list. The marketplace refers to an online store or service where users can purchase or otherwise obtain songs. Indications of songs that are popular (e.g., frequently purchased or highly rated by other users) can be obtained from such an online store or service.

Favor songs recently synchronized to device. Songs that have recently been synchronized or otherwise added to the device are to occur at a particular frequency in the shuffle list. Songs that have been recently synchronized can be identified based on a fixed value (e.g., synchronized to the device in the past two days) or a relative value (e.g., the 10% of the songs on the device that were synchronized to the device most recently).

Favor songs from recently played artists. Songs from recently played artists are to occur at a particular frequency in the shuffle list. Songs from recently played artists can be inherently identified as being liked by the user. Recently played artists refer to artists of songs that have recently been played back at a user's request (typically a request other than shuffle playback), such as selection of a particular song by the user or selection of a particular playlist by the user. Recently played artists can be identified based on a fixed value (e.g., the 5 most recently played artists) or a relative value (e.g., of all the artists of songs available to the device, the 10% of the artists that were most recently played).

Favor songs in user's playlists. Songs in playlists of the user of the device are to occur at a particular frequency in the shuffle list. Songs in playlists of the user can be inherently identified as being liked by the user. These playlists are other playlists generated by the user of the device or otherwise obtained by the device.

Favor songs not favored in the last shuffle list created. A record of the songs in each shuffle list generated using the techniques discussed herein can be maintained. Songs that are available to the device but that were not favored in the last shuffle list created by the user are to occur at a particular frequency in the current shuffle list being created. This enables the user to experience a variety of music each time he or she selects a shuffle list.

Favor songs from artists the user likes. Songs from artists that the user likes are to occur at a particular frequency in the shuffle list. Songs from artists that the user likes can be inherently identified as being liked by the user. Artists that the user likes can be identified in different manners, such as being explicitly identified by the user, being obtained from information regarding the user on a social networking service, and so forth.

Favor songs that sound good together. Songs that are determined to sound good together are to occur at a particular frequency or in a particular order (e.g., sequentially) in the shuffle list. Songs can be determined to sound good together in a variety of different manners. For example, a variety of different conventional audio fingerprinting or other audio analysis techniques can be used to identify songs that are similar or are otherwise believed to sound good together.

Figure 3:
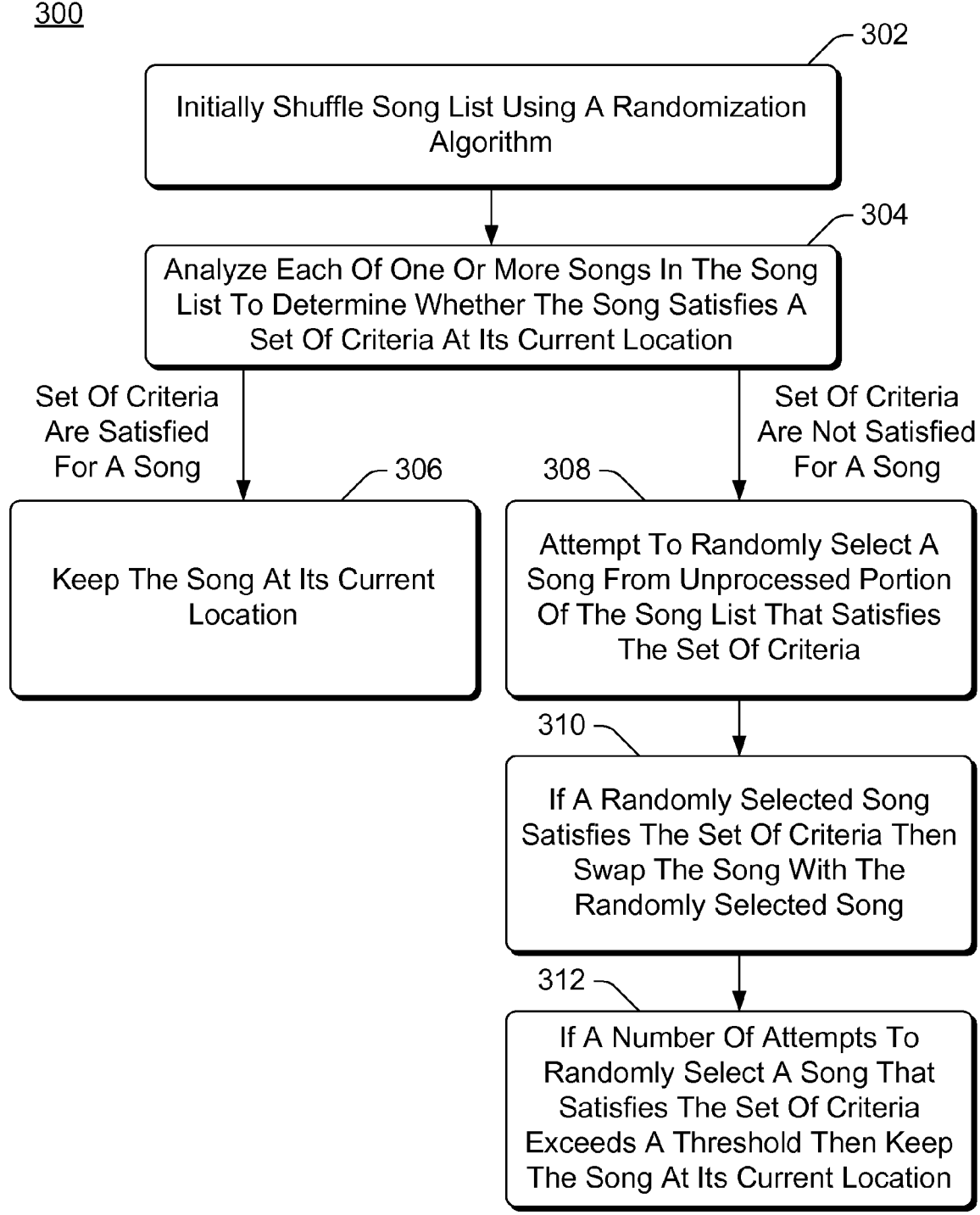
FIG. 3 is a flowchart illustrating an example process for generating a shuffle list in accordance with one or more embodiments.

FIG. 3 is a flowchart illustrating an example process 300 for generating a shuffle list in accordance with one or more embodiments. Process 300 is carried out by a shuffle module of a device, such as module 102 of FIG. 1 or module 212 of FIG. 2, and can be implemented in software, firmware, hardware, or combinations thereof. Process 300 is shown as a set of acts and is not limited to the order shown for performing the operations of the various acts. Process 300 is an example process for generating a shuffle list; additional discussions of generating a shuffle list are included herein with reference to different figures.

In process 300, a song list is initially shuffled using a randomization algorithm (act 302). The song list begins with a first song to be played back and ends with a last song to be played back. The randomization algorithm is, for example, a context-free, standard randomization algorithm that employs any of a variety of different conventional randomization techniques. The randomization algorithm is referred to as being context-free because it is not dependent on the particular songs in the song list and/or the criteria in the set of criteria discussed above.

The song list in act 302 can be obtained in a variety of different manners. In one or more embodiments, the song list in act 302 is obtained by creating a song list that includes songs that are available to the device implementing process 300. These songs can include songs available locally on the device implementing process 300 as well as songs that can be obtained from one or more remote services. The song list includes songs but excludes other audio content. For example, various spoken word content such as comedy routines, audio books, lectures or readings, and so forth are excluded from the list created in act 302. Whether particular content is to be included in or excluded from the list in act 302 can be determined in different manners. For example, the audio content available to the device implementing process 300 can have associated metadata identifying whether the content is spoken word. By way of another example, the audio content available to the device implementing process 300 can be organized such that audio content that is spoken word can be stored in a different folder or directory than other audio content. By way of yet another example, digital fingerprinting can be used to identify whether the content is spoken word.

The length of the song list obtained in act 302 can vary. In one or more embodiments, the song list has a fixed length (e.g., 1000 songs, all the songs available to the device implementing process 300, or songs totaling a particular playback length). In other embodiments, the song list has a relative length (e.g., a particular percentage of the total songs available to the device implementing process 300).

In one or more embodiments, the song list obtained in act 302 is based on some other list of songs, such as one or more other playlists on the device implementing process 300, a list of all songs available to the device implementing process 300, a playlist obtained from another device or service, and so forth.

Each of one or more songs in the song list is analyzed to determine whether the song satisfies a set of criteria at its current location in the song list (act 304). The shuffle list resulting from analyzing the songs in the song list (and swapping songs as discussed below) is then used as the song order for shuffle playback. The set of criteria can include a variety of different criteria as discussed above. In one or more embodiments, this analysis begins with the first song in the song list and then continues sequentially through the songs in the song list. This analysis can also be viewed as beginning with a current location in the song list that is where the first song location in the song list is, and sequentially updating the current location to be the next location in the song list. Songs that have been analyzed (are before the current location) are referred to as being in the processed portion of the song list, and songs that have not been analyzed (are after the current location) are referred to as being in the unprocessed portion of the song list.

Process 300 then proceeds, for each song analyzed, whether the set of criteria are satisfied for the song at its current location. If the set of criteria are satisfied for the song at the current location of the song in the song list, then the song is kept at its current location in the song list (act 306).

However, if the set of criteria are not satisfied for the song at the current location of the song in the song list, then one or more attempts are made to randomly select a song from the unprocessed portion of the song list that satisfies the set of criteria (act 308). This random selection can be made using a variety of different conventional randomization techniques. Alternatively, the attempts in act 308 can be made in different manners, such as selecting a song according to some other algorithm or rules rather than random selection, by selecting from more than just the songs later in the song list, and so forth.

If a randomly selected song satisfies the set of criteria, then the song is swapped with the randomly selected song (act 310). This swapping refers to the two songs swapping their locations in the song list so that the randomly selected song becomes the song at the current location in the song list, and the song that was previously at the current location in the song list is moved to the unprocessed portion of the song list (and can be subsequently re-analyzed).

A threshold number of attempts are made to randomly select a song from the unprocessed portion of the song list that satisfies the set of criteria. If the number of attempts to randomly select a song that satisfies the set of criteria exceeds this threshold number without any randomly selected song satisfying the set of criteria, then the song is kept at its current location (act 312). This threshold number is set so that the full algorithm can run within a reasonable amount of time.

Thus, as can be seen in acts 308-312, if the set of criteria are not satisfied for the song at the current location of the song in the song list, then one or more attempts are made to randomly select a song from the unprocessed portion of the song list that satisfies the set of criteria. Songs are randomly selected and analyzed to determine whether they satisfy the set of criteria until either a song is randomly selected that satisfies the set of criteria or a threshold number of attempts to find a song that satisfies the set of criteria are made.

Figure 4:
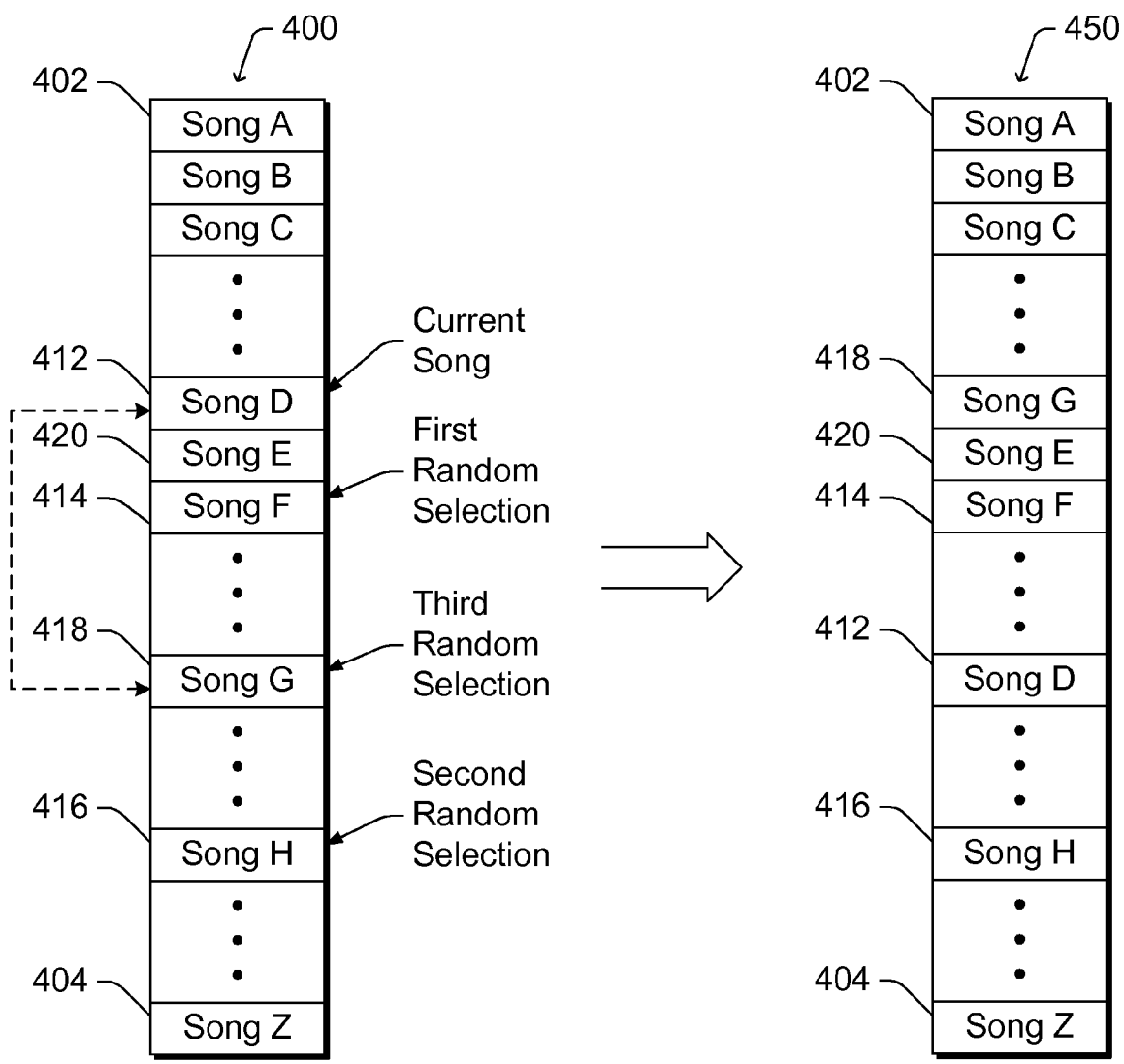
FIG. 4 is a block diagram illustrating an example song list and swapping of songs in accordance with one or more embodiments.

FIG. 4 is a block diagram illustrating an example song list and swapping of songs in accordance with one or more embodiments. FIG. 4 illustrates an example song list 400 including 1000 songs. Selected ones of these songs in song list 400 are illustrated with song names (e.g., song A, song B, etc.). The first song in the song list 400 is song 402, while the last song in song list 400 is song 404. In the example of FIG. 4 it is assumed that the song at the current location is song 412, which is the $15^{th}$ song in song list 400. Additional songs in song list 400 are: song 414, which is the $17^{th}$ song in song list 400; song 416, which is the $389^{th}$ song in song list 400; and song 418, which is the $47^{th}$ song in song list 400.

In the example of FIG. 4 it is also assumed that song 412 does not satisfy the set of criteria. Song 414 is the first randomly selected song and also does not satisfy the set of criteria. Song 416 is the second randomly selected song and also does not satisfy the set of criteria. However, song 418 is the third randomly selected song and song 418 does satisfy the set of criteria. Accordingly, songs 412 and 418 are swapped, resulting in song list 450. The song at the current location is then updated to be the next song in song list 450, which is song 420.

Figure 5:
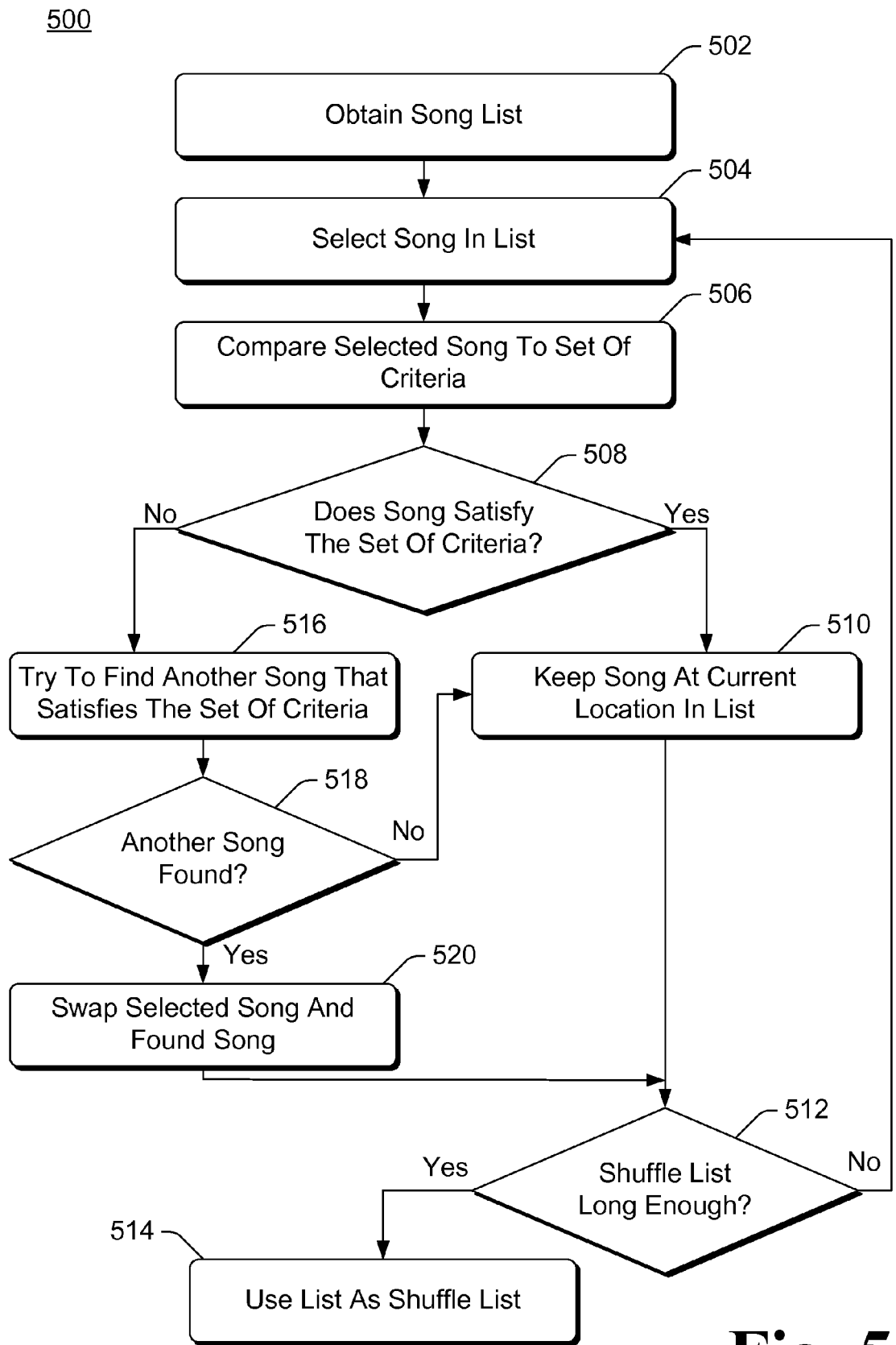
FIG. 5 is a flowchart illustrating another example process for generating a shuffle list in accordance with one or more embodiments.

FIG. 5 is a flowchart illustrating another example process 500 for generating a shuffle list in accordance with one or more embodiments. Process 500 is carried out by a shuffle module of a device, such as module 102 of FIG. 1 or module 212 of FIG. 2, and can be implemented in software, firmware, hardware, or combinations thereof. Process 500 is shown as a set of acts and is not limited to the order shown for performing the operations of the various acts. Process 500 is an example process for generating a shuffle list; additional discussions of generating a shuffle list are included herein with reference to different figures.

In process 500, a song list is obtained (act 502). The song list begins with a first song to be played back and ends with a last song to be played back. This song list can be obtained in a variety of different manners (e.g., as discussed above with respect to act 302 of FIG. 3), and can also be a song list that has been randomized using a randomization algorithm.

A song from the song list obtained in act 502 is selected (act 504). Typically the first song in the song list is selected, although other songs can alternatively be selected.

The song selected in act 504 at its current location is compared to a set of multiple criteria (act 506). A variety of different criteria, as discussed above, can be used in act 506.

Process 500 then proceeds based on whether the song satisfies the set of criteria (act 508). If the song satisfies the set of criteria, then the song is kept at its current location (e.g., entry or slot) in the song list (act 510).

Process 500 then checks whether the shuffle list is long enough (act 512). Whether the shuffle list is long enough can be determined in a variety of different manners, such as a fixed number of songs (e.g., all the songs in the song list obtained in act 502, 1000 songs, all songs available to the device implementing process 500) or a relative number (e.g., a certain percentage of the songs in the song list obtained in act 502 or available to the device implementing process 500).

In one or more embodiments, process 500 begins with selecting in act 504 the first song in the song list obtained in act 502. Process 500 then repeats act 506 and subsequent acts multiple times, each time selecting in act 504 the next song in the song list. After the last song in the song list is selected, the shuffle list is determined to be long enough in act 512. Alternatively, after a song close to the last song in the song list is selected (e.g., the song 20 songs from the last song in the song list is selected), the shuffle list is determined to be long enough in act 512.

If the shuffle list is long enough, then the song list with its current ordering of songs is used as the shuffle list (act 514). This shuffle list is then used as the song order for shuffle playback. However, if the shuffle list is not long enough, then process 500 returns to act 504 to select another song. This next song selected in act 504 is typically then next song in the song list, but need not be.

Returning to act 508, if the song does not satisfy the set of criteria, then an attempt is made to find another song in the song list that satisfies the set of criteria (act 516). In one or more embodiments, this attempt is made by randomly selecting another song later in the song list (a song between the location in the song list where the song selected in act 504 is and the end of the song list). This random selection can be made using a variety of different conventional randomization techniques. Alternatively, the attempt in act 516 can be made in different manners, such as selecting a song according to some other algorithm or rules rather than random selection, by selecting from more than just the songs later in the song list, and so forth.

In one or more embodiments, different conditions are put on the attempt in act 516. For example, a threshold number of songs can be randomly selected and checked whether they satisfy the set of criteria. This threshold number can be a fixed number of songs (e.g., 20), or a relative number of songs (e.g., 1% of the songs in the song list obtained in act 502). Once these conditions are met, the device implementing process 500 determines that another song that satisfies the set of criteria cannot be found so that the algorithm remains efficient. Alternatively, no such conditions may be placed on the attempt in act 516 (e.g., all songs later in the song list may be checked to determine whether they satisfy the set of criteria).

Process 500 proceeds based on whether another song is found in act 516 that satisfies the set of criteria (act 518). If no such song is found (the attempt in act 516 is unsuccessful), then the song is kept at its current location in the song list (act 510), and process 500 proceeds to check whether the shuffle list is long enough (act 512).

However, if such a song is found, then the found song and the song selected in act 504 are swapped (act 520). This swapping of the songs refers to the found song being placed in the location in the song list where the song selected in act 504 was, and the song selected in act 504 being placed in the location in the song list where song found in act 516 was. Process 500 then proceeds to check whether the shuffle list is long enough (act 512).

Returning to FIGS. 1 and 2, it should be noted that a shuffle module (such as module 102 of FIG. 1 or module 212 of FIG. 2) maintains a record corresponding to the set of criteria as songs are analyzed or selected and kept at their current location or swapped. The specific information in this record varies based on the particular criteria. For example, if one of the set of criteria is that every $7^{th}$ song is a song marked as a favorite, then a record is maintained of the most recent song in the shuffle list that is marked as a favorite. By way of another example, if one of the set of criteria is that no songs from the same artist are to be within 5 songs of each other (or within half the number of different artists in the user's music collection), then a record is maintained of the 5 (or half the number of different artists in the user's music collection) artists of the most recent songs in the shuffle list.

Various combinations of the criteria can be used as the set of criteria. By way of example, the set of criteria can include the following four criteria: (1) every $7^{th}$ song is a song marked as a favorite; (2) no songs marked as disliked in the first 37 songs in the shuffle list; (3) no songs from the same artist within 5 songs of each other (or within half the number of different artists in the user's music collection); and (4) every $53^{rd}$ song is from a remote content service.

Additionally, it should be noted that a variety of different modifications can be made to the techniques discussed herein to improve the accuracy and/or speed of the generating of a shuffle list. These modifications can optionally be made at runtime. For example, modifications can be made to the process for generating a shuffle list while the shuffle list is being generated.

These modifications can include modifications to the set of criteria and/or the threshold number of attempts to randomly select a song that satisfies the set of criteria. For example, assume that after a threshold number of attempts over multiple selected songs a particular criteria is not satisfied. The shuffle module can detect this situation and change the set of criteria so that this one criteria need not be satisfied (e.g., is excluded from the set of criteria). Alternatively, the threshold number of attempts to randomly select a song that satisfies the set of criteria can be lowered so that a fewer number of songs are randomly selected to determine whether they satisfy the set of criteria. By way of another example, assume that there is a large number of songs available to the device implementing process 400 (e.g., greater than a particular threshold number of songs). Given the large number of songs it may be difficult for a song to be randomly selected that satisfies the set of criteria. This situation can be detected and the shuffle module can increase the threshold number of attempts to randomly select a song that satisfy the set of criteria so that a larger number of songs are randomly selected and checked in the attempt to find another song that satisfies the set of criteria.

Modifications can also be made based on the particular device on which the shuffle list is being generated. For example, the length of the shuffle list can be dependent on the computing power of the device on which the shuffle list is being generated. Devices with greater computing power can typically generate shuffle lists more quickly than devices with less computing power. Thus, the shuffle lists generated on devices with less computing power can be shorter than the shuffle lists generated on devices with more computing powers. By way of another example, the threshold number of attempts to randomly select a song that satisfies the set of criteria can vary based on the computing power of the device on which the shuffle list is being generated. Devices with greater computing power can thus check more songs in an attempt to randomly select a song that satisfies the set of criteria, and thus increase the accuracy of the shuffle list that is generated.

In the discussions herein, the computing device playing back the content is described as the computing device generating the shuffle list. It is to be appreciated, however, that these operations can be performed by two different devices. For example, one or more computing devices can generate the shuffle list and provide that shuffle list (or portions thereof) to the computing device playing back the content.

Figure 6:
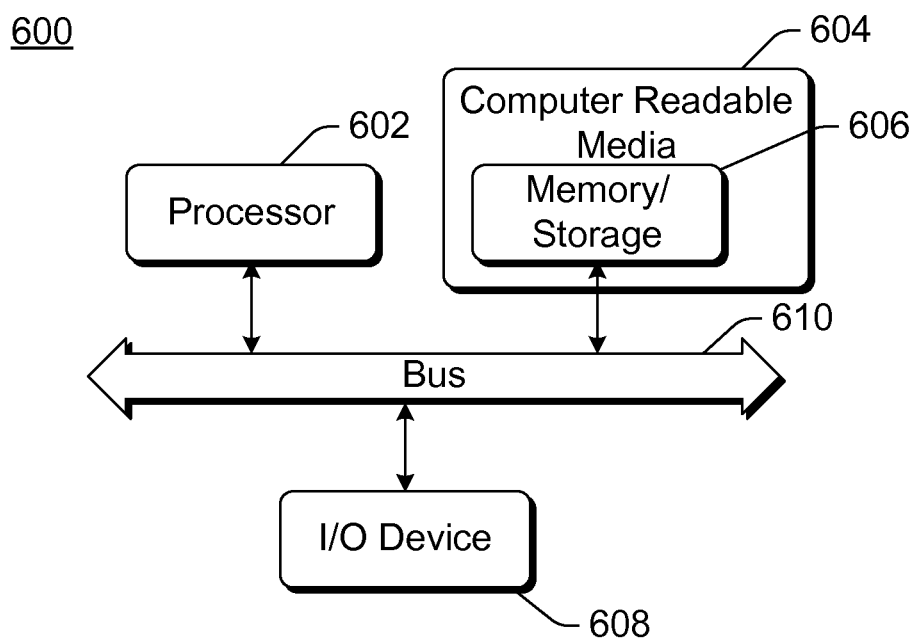
FIG. 6 illustrates an example computing device that can be configured to implement the shuffling playback content based on multiple criteria in accordance with one or more embodiments.

FIG. 6 illustrates an example computing device 600 that can be configured to implement the shuffling playback content based on multiple criteria in accordance with one or more embodiments. Computing device 600 can be, for example, computing device 100 of FIG. 1, computing device 202 of FIG. 2, or a device of content service 204 of FIG. 2.

Computing device 600 includes one or more processors or processing units 602, one or more computer readable media 604 which can include one or more memory and/or storage components 606, one or more input/output (I/O) devices 608, and a bus 610 that allows the various components and devices to communicate with one another. Computer readable media 604 and/or one or more I/O devices 608 can be included as part of, or alternatively may be coupled to, computing device 600. Bus 610 represents one or more of several types of bus structures, including a memory bus or memory controller, a peripheral bus, an accelerated graphics port, a processor or local bus, and so forth using a variety of different bus architectures. Bus 610 can include wired and/or wireless buses.

Memory/storage component 606 represents one or more computer storage media. Component 606 can include volatile media (such as random access memory (RAM)) and/or non-volatile media (such as read only memory (ROM), Flash memory, optical disks, magnetic disks, and so forth). Component 606 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 602. It is to be appreciated that different instructions can be stored in different components of computing device 600, such as in a processing unit 602, in various cache memories of a processing unit 602, in other cache memories of device 600 (not shown), on other computer readable media, and so forth. Additionally, it is to be appreciated that the location where instructions are stored in computing device 600 can change over time.

One or more input/output devices 608 allow a user to enter commands and information to computing device 600, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer readable memory devices, further description of which may be found with reference to FIG. 6. The features of the shuffling playback content based on multiple criteria techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. One or more computer-readable storage memories embodying computer-readable instructions, which, when executed, implement a method comprising:
   obtaining musical preference information from a social network service for a user of the social network;
   determining criteria for shuffling a song list based on the musical preference information obtained from the social network; and
   generating a shuffled list of songs for the user by:
      selecting a first song from a current location in the song list;
      determining whether the first song satisfies the criteria that are based on the musical preference information; and
      if the first song satisfies the criteria that are based on the musical preference information then keeping the first song in the current location in the song list; and
      if the first song does not satisfy the criteria that are based on the musical preference information then,
         attempting to find a second song in the song list that satisfies the criteria by randomly selecting the second song from the song list and checking whether the second song satisfies the criteria,
         swapping the first song and the second song if the second song satisfies the criteria, and
         if a number of attempts to randomly select a song that satisfies the criteria exceeds a threshold number of attempts without randomly selecting a song satisfying the criteria, then keeping the first song at its current location in the song list, the threshold number of attempts corresponding to at least one of a fixed number of songs or a number of songs relative to a number of songs in the song list.

2. The one or more computer-readable storage memories of claim 1, wherein the musical preference information is obtained from at least one of a profile that corresponds to the user on the social network or a profile that corresponds to a friend of the user on the social network.

3. The one or more computer-readable storage memories of claim 1, wherein the musical preference information corresponds to songs that are identified as being liked by the user.

4. The one or more computer-readable storage memories of claim 1, wherein the musical preference information corresponds to artists that are identified as being liked by the user.

5. The one or more computer-readable storage memories of claim 1, wherein the musical preference information corresponds to indications of songs that are identified as being liked by friends of the user on the social network.

6. The one or more computer-readable storage memories of claim 1, wherein the musical preference information corresponds to indications of artists that are identified as being liked by friends of the user on the social network.

7. The one or more computer-readable storage memories of claim 1, wherein the song list is initially shuffled to have a random ordering of songs.

8. The one or more computer-readable storage memories of claim 1, wherein the criteria further include a frequency at which songs that are identified as being liked by the user, and a frequency at which songs by artists that are identified as being liked by the user occur in the shuffled list of songs.

9. A method for generating a shuffle list in a device, the method comprising:
obtaining musical preference information for a user of the device from a social network service;
analyzing, by the device, each of one or more songs in a song list to determine whether the song satisfies a set of shuffling criteria at a current location in the song list to generate a shuffled list of songs for playback, the set of shuffling criteria includes criteria that are based on the musical preference information obtained for the user of the device from the social network service;
for each song that satisfies the set of shuffling criteria, keeping the song at the current location in the song list; and
for each song that does not satisfy the set of shuffling criteria, attempting to randomly select a song in a portion of the song list that satisfies the set of shuffling criteria, and:
if a randomly selected song satisfies the set of shuffling criteria then swapping a song that does not satisfy the set of shuffling criteria with the randomly selected song, and
if a number of attempts to randomly select a song that satisfies the set of shuffling criteria exceeds a threshold without a randomly selected song satisfying the set of shuffling criteria, then keeping a song that does not satisfy the set of shuffling criteria at the current location in the song list, the threshold number of attempts corresponding to at least one of a fixed number of songs or a number of songs relative to a number of songs in the song list.

10. The method of claim 9, further comprising:
using, after keeping songs at their current locations or swapping songs with different songs, the song list as the shuffled list of songs for shuffle playback; and
playing back songs in the order of the shuffled list of songs.

11. The method of claim 9, wherein the musical preference information is obtained from a profile that corresponds to the user of the device.

12. A method comprising:
obtaining musical preference information from a social network service for a user of the social network;
determining criteria for shuffling a song list based on the musical preference information obtained from the social network; and
generating a shuffled list of songs for the user by:
selecting a first song from a current location in the song list;
determining whether the first song satisfies the criteria that are based on the musical preference information; and
if the first song satisfies the criteria that are based on the musical preference information then keeping the first song in the current location in the song list; and
if the first song does not satisfy the criteria that are based on the musical preference information then,
attempting to find a second song in the song list that satisfies the criteria by randomly selecting the second song from the song list and checking whether the second song satisfies the criteria,
swapping the first song and the second song if the second song satisfies the criteria, and
if a number of attempts to randomly select a song that satisfies the criteria exceeds a threshold number of attempts without randomly selecting a song satisfying the criteria, then keeping the first song at its current location in the song list, the threshold number of attempts corresponding to at least one of a fixed number of songs or a number of songs relative to a number of songs in the song list.

13. The method of claim 12, wherein the musical preference information is obtained from at least one of a profile that corresponds to the user on the social network or a profile that corresponds to a friend of the user on the social network.

14. The method of claim 12, wherein the musical preference information corresponds to songs that are identified as being liked by the user.

15. The method of claim 12, wherein the musical preference information corresponds to artists that are identified as being liked by the user.

16. The method of claim 12, wherein the musical preference information corresponds to indications of songs that are identified as being liked by friends of the user on the social network.

17. The method of claim 12, wherein the musical preference information corresponds to indications of artists that are identified as being liked by friends of the user on the social network.

18. The method of claim 12, wherein the song list is initially shuffled to have a random ordering of songs.

19. The method of claim 12, wherein the criteria further include a frequency at which songs that are identified as being liked by the user, and a frequency at which songs by artists that are identified as being liked by the user occur in the shuffled list of songs.

\* \* \* \* \*